(12) United States Patent
Holt (10) Patent No.: US 9,081,094 B2
(45) Date of Patent: Jul. 14, 2015

(54) AIRCRAFT RADAR ALTIMETER STRUCTURE

(71) Applicant: Honeywell International Inc., Morristown, MN (US)

(72) Inventor: Keone J. Holt, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 339 days.

(21) Appl. No.: 13/760,347

(22) Filed: Feb. 6, 2013

(65) Prior Publication Data

US 2013/0214964 A1    Aug. 22, 2013

Related U.S. Application Data

(60) Provisional application No. 61/601,717, filed on Feb. 22, 2012.

(51) Int. Cl.
*G01S 13/88* (2006.01)
*G01S 13/94* (2006.01)
(Continued)

(52) U.S. Cl.
CPC ............... *G01S 13/882* (2013.01); *G01C 5/005* (2013.01); *G01S 13/94* (2013.01);
(Continued)

(58) Field of Classification Search
CPC ..................... H01Q 1/002; H01Q 1/12–1/221; H01Q 1/27; H01Q 1/28; H01Q 1/281; H01Q 1/286; H01Q 1/287; G01S 13/88; G01S 13/882; G01S 13/94; G01S 13/913; G01C 5/005
USPC .......... 342/120–122, 175; 343/705, 706, 708, 343/711, 712, 713, 872, 873
See application file for complete search history.

(56) References Cited

U.S. PATENT DOCUMENTS 1,942,594 A * 1/1934 Edwards et al. ............... 342/120
4,489,328 A * 12/1984 Gears ...................... 343/700 MS
(Continued)

FOREIGN PATENT DOCUMENTS

DE         19855367        6/2000
JP       2005151444        6/2005
(Continued)

OTHER PUBLICATIONS

European Patent Office, "Office Action", "from Foreign Counterpart of U.S. Appl. No. 13/760,347", Jun. 19, 2013, pp. 16, Published in: EP.
(Continued)

*Primary Examiner* — Peter Bythrow
(74) *Attorney, Agent, or Firm* — Fogg & Powers LLC (57) ABSTRACT

Embodiments described herein are directed towards a radar altimeter for mounting onto an aircraft. The radar altimeter includes a base configured to mount to an external surface of an aircraft, the base having an inner portion and a flange disposed around the inner portion, wherein the inner portion has a generally rectangular geometry defining a long dimension and a short dimension. A chassis is mounted to the base and has a planar portion that is disposed perpendicular to a plane formed by the base. A plurality of circuit boards are mounted to the planar portion of the chassis and disposed parallel to the planar portion of the chassis. The base is configured to mount over a second aperture in the external surface of the aircraft such that the chassis and the plurality of circuit boards are placed through the aperture and are disposed inside of the aircraft.

20 Claims, 5 Drawing Sheets

(51) Int. Cl.

| | |
|---|---|
| *G01C 5/00* | (2006.01) |
| *H01Q 1/12* | (2006.01) |
| *H01Q 1/22* | (2006.01) |
| *H01Q 1/27* | (2006.01) |
| *H01Q 1/28* | (2006.01) |
| *G01S 7/02* | (2006.01) |

(52) U.S. Cl.
 CPC ............ *G01S 2007/027* (2013.01); *H01Q 1/12* (2013.01); *H01Q 1/22* (2013.01); *H01Q 1/27* (2013.01); *H01Q 1/28* (2013.01); *H01Q 1/286* (2013.01); *H01Q 1/287* (2013.01); *Y10T 29/49018* (2015.01)

(56) References Cited

U.S. PATENT DOCUMENTS

| | | | |
|---|---|---|---|
| 4,577,163 A | 3/1986 | Culp | |
| 4,695,013 A * | 9/1987 | Trampnau | 244/17.13 |
| 4,706,050 A * | 11/1987 | Andrews | 333/205 |
| 4,739,860 A * | 4/1988 | Kobayashi et al. | 181/123 |
| 4,894,659 A * | 1/1990 | Andrews | 342/121 |
| 4,945,360 A | 7/1990 | Trummer et al. | |
| 4,965,533 A | 10/1990 | Gilmore | |
| 4,968,967 A * | 11/1990 | Stove | 342/165 |
| 4,979,154 A * | 12/1990 | Brodeur | 367/116 |
| 5,047,779 A * | 9/1991 | Hager | 342/120 |
| 5,184,141 A * | 2/1993 | Connolly et al. | 343/705 |
| 5,353,038 A * | 10/1994 | Osborne et al. | 343/708 |
| 5,648,786 A * | 7/1997 | Chung et al. | 343/770 |
| 5,757,239 A | 5/1998 | Gilmore | |
| 5,757,311 A | 5/1998 | Voyce | |
| 6,295,020 B1 | 9/2001 | Koechlin | |
| 6,335,699 B1 * | 1/2002 | Honma | 342/4 |
| 6,384,770 B1 | 5/2002 | de Gouy et al. | |
| 6,426,717 B1 * | 7/2002 | Maloratsky | 342/122 |
| 6,434,085 B1 * | 8/2002 | Nedwell | 367/100 |
| 6,486,826 B1 | 11/2002 | Cramer et al. | |
| 6,768,469 B2 * | 7/2004 | Hager et al. | 343/770 |
| 7,095,364 B1 * | 8/2006 | Rawdon et al. | 342/120 |
| 7,132,990 B2 * | 11/2006 | Stenger et al. | 343/754 |
| 7,161,527 B2 * | 1/2007 | Vacanti | 342/121 |
| 7,239,266 B2 * | 7/2007 | Vacanti | 342/120 |
| 7,463,710 B2 | 12/2008 | Walsh et al. | |
| 7,791,415 B2 | 9/2010 | Hornbuckle | |
| 7,889,147 B2 * | 2/2011 | Tam et al. | 343/777 |
| 8,085,097 B2 | 12/2011 | Cloutier et al. | |
| 8,638,139 B2 | 1/2014 | Keaveney et al. | |
| 8,866,667 B2 * | 10/2014 | Vacanti | 342/120 |
| 2011/0122017 A1 * | 5/2011 | Vacanti | 342/175 |
| 2011/0205105 A1 | 8/2011 | Reuter | |
| 2012/0112806 A1 | 5/2012 | Dayi | |
| 2012/0200447 A1 * | 8/2012 | Vacanti | 342/29 |
| 2012/0242383 A1 | 9/2012 | Elad et al. | |
| 2013/0033402 A1 * | 2/2013 | Meyer | 343/705 |
| 2013/0214963 A1 * | 8/2013 | Vacanti | 342/120 |
| 2013/0214964 A1 * | 8/2013 | Holt | 342/120 |
| 2014/0070985 A1 | 3/2014 | Vacanti | |

FOREIGN PATENT DOCUMENTS

| | | |
|---|---|---|
| JP | 2013200135 | 10/2013 |
| WO | 2011064157 | 6/2011 |

OTHER PUBLICATIONS

U.S. Patent and Trademark Office, "Notice of Allowance ", "from U.S. Appl. No. 13/662,755", Jun. 27, 2014, pp. 1-31.

Benard, "A High-Stability Low-Offset Phase-Locked-Loop Frequency Synthesizer", "IEEE Transactions on Instrumentation and Measurement", Sep. 1975, pp. 222-224, vol. IM-24, No. 3.

Bisanti et al., "Fully integrated Sigma-Delta Synthesizer Suitable for 'Indirect VCO modulation' in 2.5G application", "2003 IEEE Radio Frequency Integrated Circuits Symposium", as early as Dec. 2003, pp. 515-518.

Appel, "Fractional N Synthesizers", "RF Signal Processing", Nov. 2000, pp. 1-9.

"KRA 10A Radar Altimeter", May 2000, pp. 1-4, Publisher: Allied Signal Aerospace.

"TRA-3000 and TRA-3500 Radar Altimeters", Feb. 2009, pp. 1-2, Publisher: Free Flight Systems.

Gaglio et al., "An Integrated GaAs 1.25 GHz Clock Frequency FM-CW Direct Digital Synthesizer", Oct. 1993, pp. 167-170.

"Honeywell HG8500 Series Radar Altimeter", Jul. 2003, pp. 1-2, Publisher: Honeywell International Inc.

Jeong et al., "A Multi-Beam and Multi-Range Radar with FMCW and Digital Beam Forming for Automotive Applications", "Progress in Electromagnetics Research", Nov. 2011, pp. 285-299, vol. 124.

Nash, "Phase-Locked Loop Design Fundamentals", Feb. 2006, pp. 1-22, Publisher: Freescale Semiconductor.

Pazarci, "Phase-Lock Systems (ELE608E-01)", Jan. 27, 2009, pp. 1-2.

"Miniature Radar Altimeter: MRA Type 1", May 2012, pp. 12, Publisher: Roke Manor Research Limited.

"Miniature Radar Altimeter: MRA Type 2", May 2012, pp. 1-2, Publisher: Roke Manor Research Limited.

Saul, "Direct Frequency Synthesis: A Review of the Technique and Potential", Jul. 1990, pp. 5-9, Publisher: Plessey Research Caswell, U.K.

"Micro Radar Altimeter: UMRR-0A", Dec. 2011, pp. 1-2, Publisher: S.M.S. Smart Microwave Sensors GmbH.

"Radar Altimeter System Comparison", Dec. 2011, p. 1 Publisher: Southeast Aerospace.

"Fractional/Integer-N PLL Basics", Aug. 1999, pp. 1-55, Publisher: Texas Instruments.

European Patent Office, "European Search Report", "from Foreign Counterpart of U.S. Appl. No. 13/662,755", Jun. 7, 2013, pp. 1-3, Published in: EP.

European Patent Office, "European Search Report", "from Foreign Counterpart of U.S. Appl. No. 13/760,347", Jun. 6, 2013, pp. 1-3, Published in: EP.

* cited by examiner

FIG. 4

AIRCRAFT RADAR ALTIMETER STRUCTURE

CROSS-REFERENCE TO RELATED APPLICATIONS

This application claims the benefit of U.S. Provisional Application No. 61/601,717, filed on Feb. 22, 2012, which is incorporated herein by reference in its entirety.

BACKGROUND

There are many designs of conventional radar altimeters for use in an aircraft. Many conventional radar altimeters are designed in multiple pieces, with most of the electronic components in a line replaceable unit (LRU) that connects via one or more cables to one or more antennas in separate units. Such antennas are mounted to an aircraft's skin and the LRU may also be mounted to the aircraft's skin or may be mounted somewhere else internally. Such radar altimeters require a service person to enter the inside of the aircraft for service and installation, and include multiple pieces to mount and maintain.

Other conventional radar altimeters have the electronics and antenna(s) integrated into a single package. Many of these radar altimeters are designed to mount to the internal surface of the aircraft's skin, and therefore still require a service person to enter the inside the aircraft for service and installation. Also, many of these radar altimeters that integrate the electronics and antenna(s) have a large footprint on the aircraft's skin, which results in having to cut structure members for the aircraft's skin. Cutting the structural members reduces the structural integrity of those structural members, requiring a structure plate to be added to address the structural deficiency in that area. As such, these conventional radar altimeters have significant installation requirements.

Still other conventional radar altimeters are mounted to an aircraft such that the structure extends significantly outward (e.g., 0.75-3 inches) from the exterior of the aircraft. Such a structure can affect the aerodynamics of the aircraft and is also more directly exposed to weather.

SUMMARY

Embodiments described herein are directed towards a radar altimeter for mounting onto an aircraft. The radar altimeter includes a base configured to mount to an external surface of an aircraft, the base having an inner portion defining a first aperture and a flange disposed around the inner portion, wherein the inner portion has a generally rectangular geometry defining a long dimension and a short dimension. A chassis is mounted to the base and has a planar portion that is disposed perpendicular to a plane formed by the base and extends parallel to the long dimension of the generally rectangular geometry. A plurality of circuit boards are mounted to the planar portion of the chassis and disposed parallel to the planar portion of the chassis. An antenna module is disposed proximate a first aperture formed in the base, the antenna module coupled to at least one of the plurality of circuit boards. The base is configured to mount over a second aperture in the external surface of the aircraft such that the chassis and the plurality of circuit boards are placed through the aperture and are disposed inside of the aircraft.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

Figure 1:
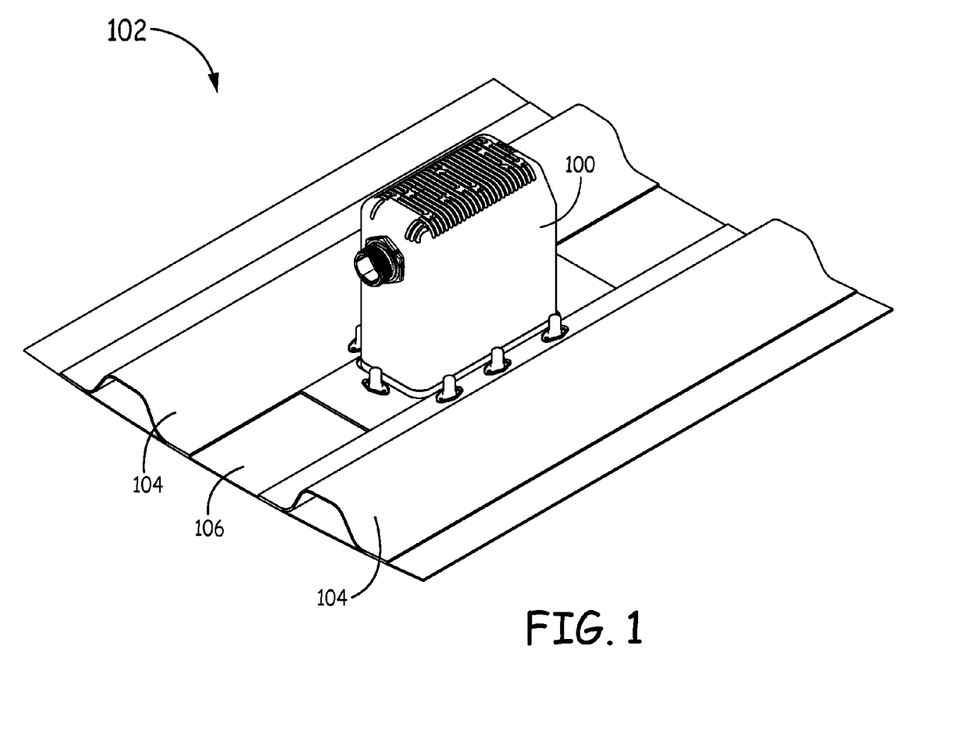
FIG. 1 is a cut-away perspective view of an internal side of an aircraft exterior having a radar altimeter that is attached to an exterior surface of the aircraft and is primarily contained in the area internal to the aircraft according to embodiments described herein.

FIG. 1 is a cut-away perspective view of an internal side of an aircraft exterior 102 having a radar altimeter 100 that is attached to an exterior surface of the aircraft and is primarily contained in the area internal to the aircraft. As shown in the cut-away view of FIG. 1, the aircraft exterior 102 includes a plurality of structural members 104 and the aircraft skin 106. The term "structural member" as used herein includes any elongated structure that extends along the aircraft skin 106 to provide structural support for the aircraft skin 106. In many implementations, the internal surface of the aircraft skin 106 is fastened to the structure member 104. The structural members 104 can include a stringer, longeron, rib, frame, former, or other structural member to which the aircraft skin 106 is attached. In some modern aircraft, there is less than three inches of space between adjacent structural members 104.

The radar altimeter 100 described herein has dimensions that enable the altimeter 100 to be installed in-between particular adjacent structural members 104 without requiring cutting and removal of significant portions of such structural members 104. The radar altimeter 100 has a generally rectangular cross-section defining a short dimension and a long dimension. The short dimension is less than 3 inches in length enabling the radar altimeter to be installed in-between adjacent structural members 104.

Figure 2A:
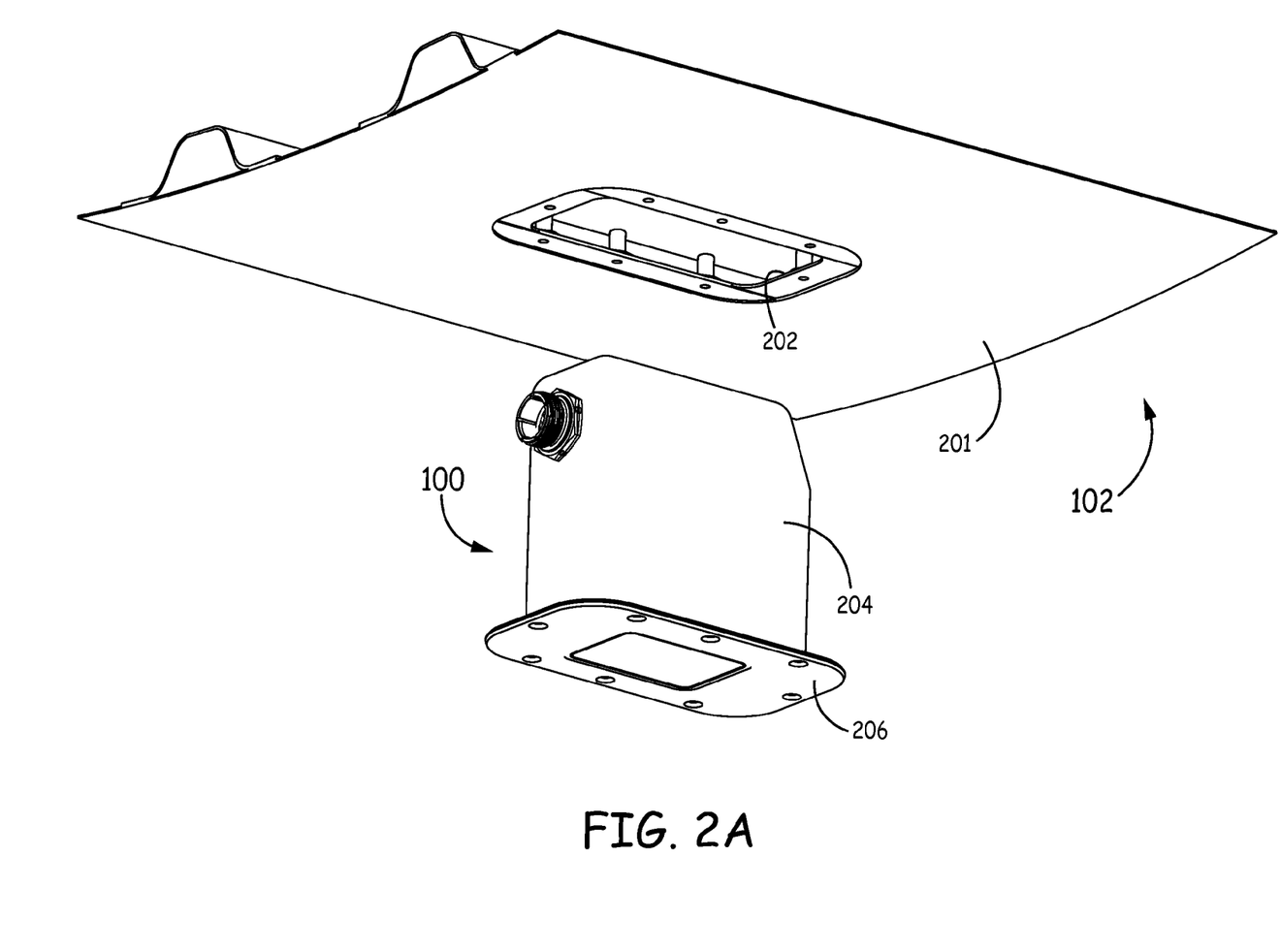
FIG. 2A is a partially exploded view showing the exterior surface of the aircraft exterior and the radar altimeter according to embodiments described herein.

FIG. 2A is a partially exploded view showing the exterior surface 201 of the aircraft exterior 102 and the radar altimeter 100. As shown, an aperture 202 is cut into the aircraft exterior 102. The aperture 202 is sized such that the body 204 of the radar altimeter 100 can be inserted through the aperture 202 and the mounting flange 206 of the radar altimeter 100 will contact the exterior surface of the aircraft exterior 102 adjacent the aperture 202. The mounting flange 206 can then be fastened to the aircraft exterior 102, such as with a plurality of bolts.

The aperture 202 can be generally rectangular in shape to match the cross-section of the radar altimeter 100. The aperture 202 can be less than 3 inches across in the short dimension and the aperture 202 can be disposed between adjacent structural members 104.

Figure 2B:
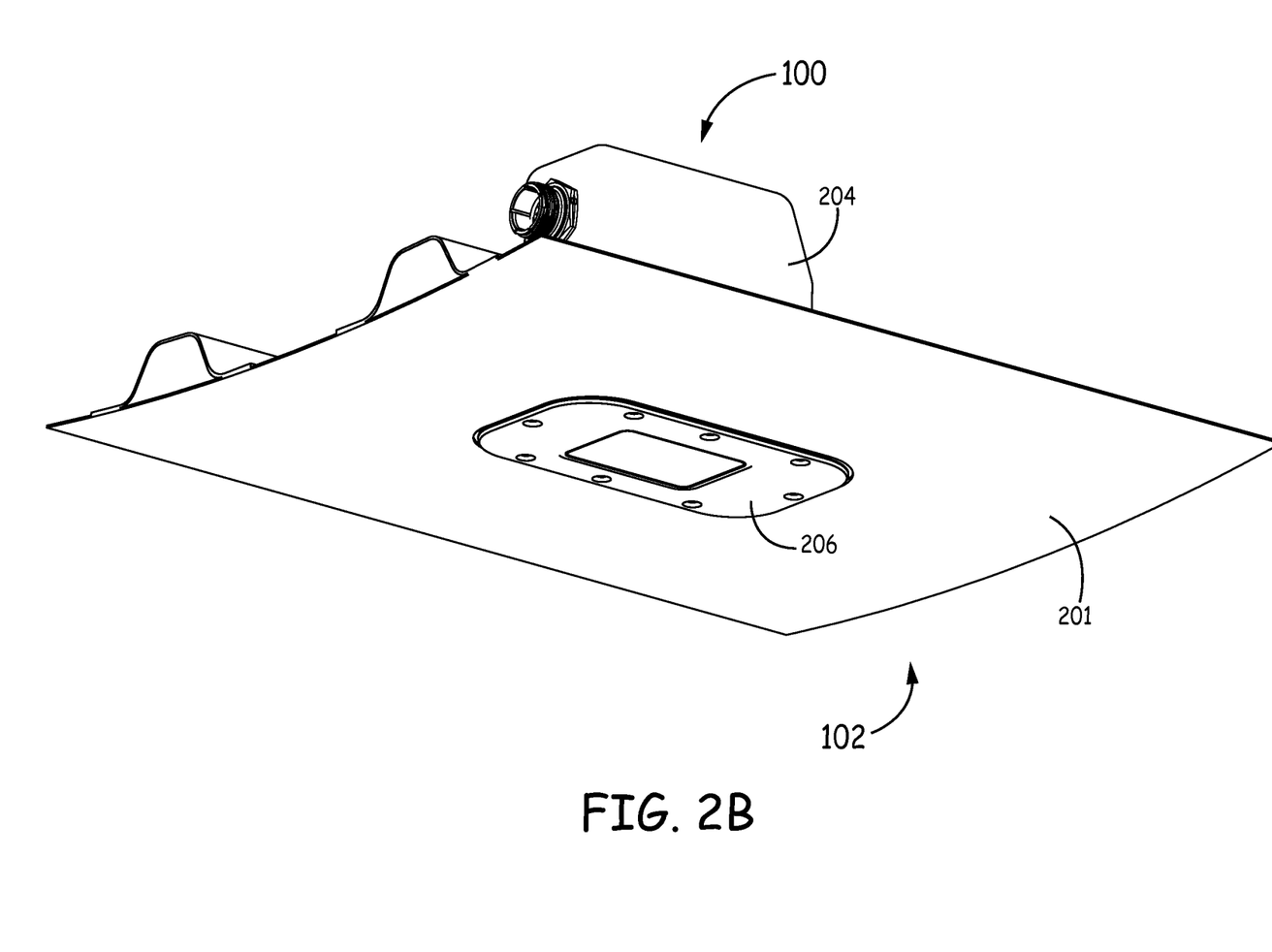
FIG. 2B is a cut-away perspective view showing the radar altimeter installed in the aperture of the aircraft exterior according to embodiments described herein.

FIG. 2B is a cut-away perspective view showing the radar altimeter 100 installed in the aperture 202 of the aircraft exterior 102. As shown, the flange 206 of the radar altimeter 100 abuts against the exterior surface 201 of the aircraft exterior 102. A plurality of fasteners (e.g., bolts) can be used to secure the flange 206 against the aircraft exterior 102. Advantageously, when installed in the aircraft, the vast majority of the radar altimeter 100 is disposed internal to the aircraft exterior 102, and the radar altimeter 100 protrudes outward from the aircraft exterior 102 only a small distance. In an example, the radar altimeter 100 protrudes less than 5 mm outward from the aircraft exterior 102.

Figure 3:
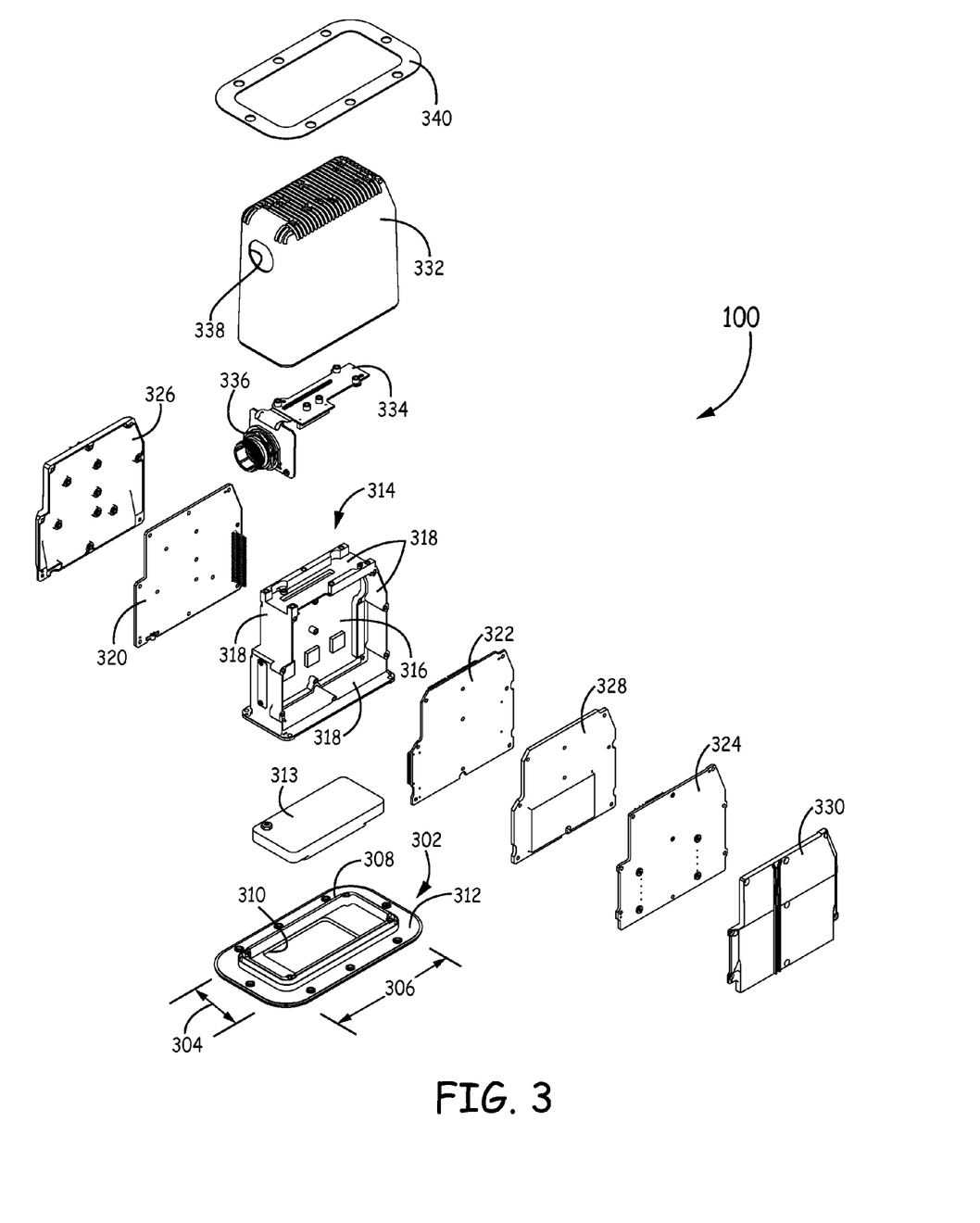
FIG. 3 is an exploded view of a radar altimeter according to embodiments described herein.

FIG. 3 is an exploded view of the radar altimeter 100. The radar altimeter 100 includes a base 302. The base includes an inner portion 308 defining a first aperture 310 and a flange 312 forming a perimeter around the inner portion 308. The edge of the inner portion 308 is raised relative to the flange 312 and is configured to fit inside of the aperture 202 in the aircraft exterior 102. The inner portion 308 has a generally rectangular geometry defining a short dimension 304 and a long dimension 306. The short dimension 304 is less than 3 inches in length such that the inner portion 308 can be disposed between adjacent structural members 104. In an example, the short dimension is about 2.5 inches and the long dimension 306 is about 6.1 inches. The flange 312 is configured to contact and attach to an exterior surface of the aircraft skin 106 adjacent to and surrounding the aperture 202. In this example, the flange 312 is configured to be attached to the aircraft exterior 102 with a plurality of bolts (e.g., 8 bolts). In an example, the base 302 is composed of metal.

One or more antenna modules 313 are configured to be attached to the inner portion 308 of the base 302. The antenna module(s) 313 can include one or more antennas. The antenna module(s) 313 are mounted to the base 302 such that the one or more antennas can transmit and receive signals through the first aperture 310 in the base 302. In an example, a portion of the antenna module(s) 313 extends into or through the first aperture 310 to provide the antennas with a wider window to transmit and receive signals. In some examples, more than one first aperture 310 can be included in the base 302 to accommodate more than one antenna module 313, and/or antennas.

The radar altimeter 100 also includes a chassis 314 to which a plurality of circuit boards are mounted. The chassis 314 includes a planar portion 316 and a plurality of side walls 318 extending from edges of the planar portion 316. The chassis 314 is attached to the inner portion 308 of the base 302. The chassis 314 is sized to fit inside the aperture 202 in the aircraft exterior 102. As such, the chassis 314 is mounted such that it is longer in a dimension parallel to the long dimension 306 of the inner portion 102 and is less than 3 inches in length in a direction parallel to the short dimension 304. The planar portion 316 of the chassis 318 is configured to have circuit boards mounted thereto. The chassis 314 is oriented such that the planar portion 316 is perpendicular to a plane formed by the base 302 and extends in parallel with the long dimension 306 of the inner portion 102. In an example, the chassis 314 is composed of metal.

The plurality of circuit boards mounted to the chassis 314 include a radio frequency (RF) circuit board 320. The RF circuit board 320 includes components to form the transceiver front end for the radar altimeter 100. In an example, the RF circuit board 320 includes the analog and digital RF components of the transceiver such as a fractional-n synthesizer, a transmit amplifier, a processing device, a master clock, and an analog to digital converter. In an example, the RF circuit board 320 is coupled to the antenna module 313 via a blind mate connector for transmission and reception of signals. The RF circuit board 320 is mounted to a first side of the planar portion 316 of the chassis 314 and is oriented in parallel to the planar portion 316.

The plurality of circuit boards also include a digital circuit board 322. The digital circuit board 322 includes components to perform digital processing for the radar altimeter including at least one processing device. In an example, the digital circuit board 322 includes digital components such as a digital signal processor (DSP), memory and input/output devices. The digital circuit board 322 is mounted to a second side of the planar portion 316 and is oriented in parallel to the planar portion 316, wherein the second side of the planar portion 316 is reverse of the first side. The plurality of circuit boards also include a power supply board 324. The power supply board 324 includes components to condition and provide power to components on the digital circuit board 322 and the RF circuit board 320. The power supply board 324 is mounted to the sidewalls 318 of the chassis 314 and is oriented parallel to the planar portion 316 of the chassis 314. In this example, the power supply board 324 is disposed outward from the digital circuit board 322.

In an example, a plurality of isolation covers are also included to isolate RF signals between the respective circuit boards 320, 322, 324, as well as to reduce RF signals outside of the radar altimeter 100. The chassis 314 being composed of metal provides isolation between the RF circuit board 320 and the digital circuit board 322. A first isolation cover 326 is disposed to cover the side of the RF circuit board 320 that is reverse of the planar portion 316 of the chassis 314. The first isolation cover 326 can be mounted to the chassis 314 along with the RF circuit board 320 using a plurality of screws. A second isolation cover 328 is disposed to cover the side of the digital circuit board 322 that is reverse of the planar portion 316 of the chassis 314 and, as such, is disposed between the digital circuit board 322 and the power supply board 324. The second isolation cover 328 can be mounted to the chassis 314 along with the digital circuit board 322 using a plurality of screws. A third isolation cover 330 is disposed to cover the side of the power supply board 324 that is reverse of the second isolation cover 328. The third isolation cover 330 can be mounted to the chassis 314 along with the power supply board 334 using a plurality of screws. The first, second, and third isolation covers 326, 328, 330 can be composed of metal or other suitable material for RF signal isolation.

With the circuit boards 320, 322, 324 mounted (via the chassis 314) to the base 302 in an "upright" manner (i.e., perpendicular to the base 302), enables the overall geometry of the radar altimeter 100 to be less than 3 inches in the short dimension 304. This facilitates mounting the radar altimeter between the structural members 104 in an aircraft's exterior 102.

The radar altimeter 100 also includes an environmental housing 332 disposed over and around the chassis 314, the plurality of circuit boards 320, 322, 324 and their isolation covers 326, 328, 330. The environmental housing 332 is attached to the chassis 314, such that the chassis 314, the plurality of circuit boards 320, 322, 324 and their isolation covers 326, 328, 330 are enclosed by the environmental housing 332 and the base 302.

A lightning protection circuit board 334 is disposed outward from a first edge of the planar portion 316 of the chassis 314, the first edge being opposite an edge of the planar portion 316 of the chassis 314 that is proximate the base 302. The lightning protection circuit board 334 includes components to protect the other components of the radar altimeter 100 from lightning induced currents on cables connected to a connector 336 of the radar altimeter 100. Such cables run within the aircraft to other devices in the aircraft and can have currents induced thereon during a lighting strike of the aircraft. In an example, the lightning protection circuit board 334 is oriented in parallel with the base. In an example, the lightning protection circuit board 334 is attached to an inside of the environmental housing 332. The connector 336 extends out of a second aperture 338 in the environmental housing 332 for connection to cables running through the aircraft. In an example, power and digital and analog signals used to control and monitor performance of the radar altimeter 100 are provided through the connector 336. A gasket 340 is disposed on the surface of the flange 312 which contacts the exterior surface of the aircraft.

Figure 4:
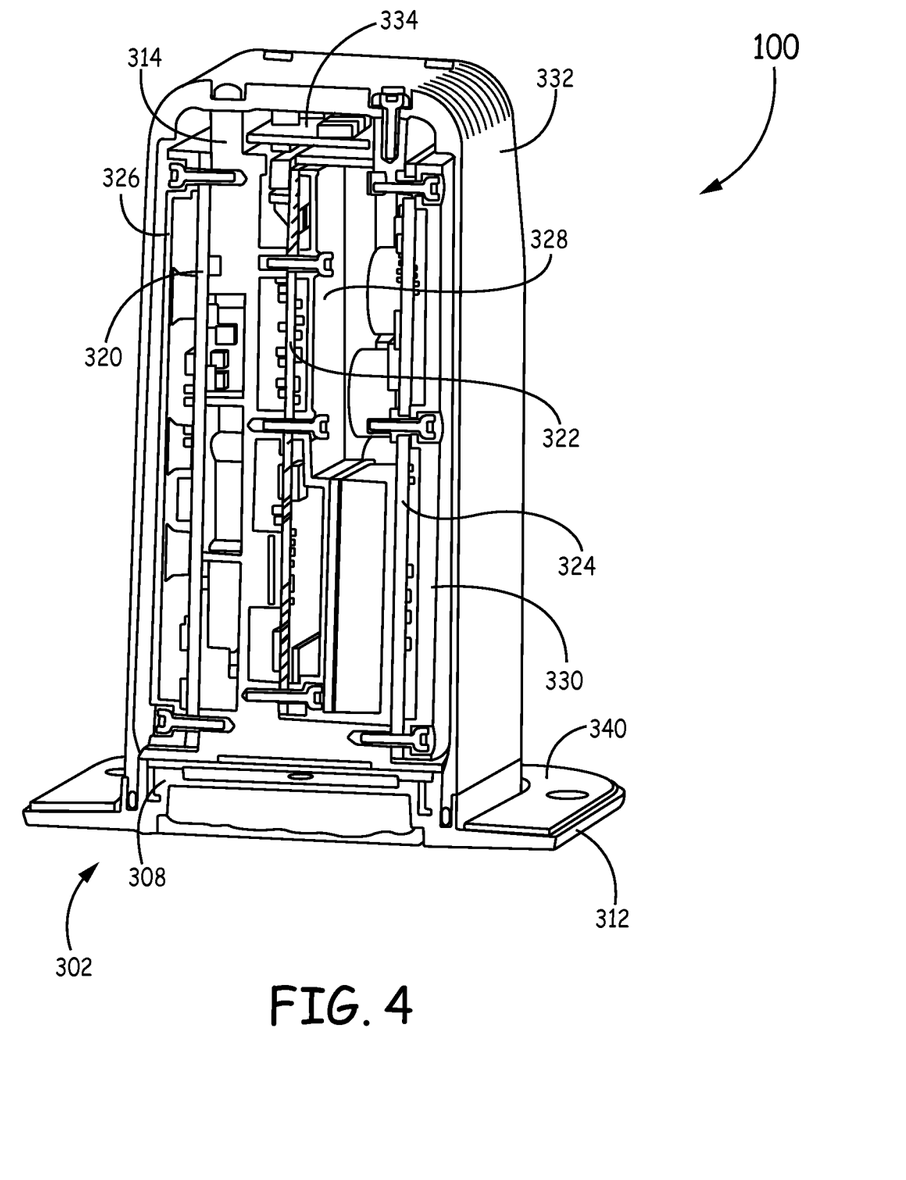
FIG. 4 is a cut-away view of the radar altimeter of FIG. 3 according to embodiments described herein.

FIG. 4 is a cut-away view of the radar altimeter 100. As shown, the environmental housing 332 is mounted to the chassis 314 and engages the base 302 which together encloses the electronic components. Inside the environmental housing 332, the chassis 314 is mounted to the base 302. The first isolation cover 326 and RF circuit board 320 are mounted to a first side of the chassis 314. The third isolation cover 330, power supply board 324, second isolation cover 328, and digital circuit board 322 are mounted to a second and reverse side of the chassis 314. The assembled radar altimeter 100 is configured to mount to the exterior surface of the aircraft via the flange 312 of the base 302.

Advantageously, the radar altimeter described with respect to FIGS. 1-4 enables a short connection distance between the antenna(s) in the antenna module(s) 313 and the electronics on the RF circuit board 320. Additionally, the shape of the package enables the radar altimeter 100 to fit within a re-enforcement structure (structural members and frames) of the fuselage. Specifically, newer class aircraft use structural members that are narrowly spaced. The package of the altimeter 100 is designed to avoid cutting away any structural member or frames to allow installation. This reduces the cost of integration of the radar altimeter 100 and achieves a large weight saving by eliminating the need to add "sister" structure structural members and frames that would otherwise have been cut away to make room for the altimeter environmental housing and connector. Thus, the aspect ratio and the height of the package have been set such that the radar altimeter 100 will fit on a large number of aircraft fuselages with little impact to the fuselage structure.

The radar altimeter 100 can be assembled by attaching a plurality of circuit boards 320, 322, 324 to the chassis 314, wherein the plurality of circuit boards 320, 322, 324 are oriented in parallel with the planar portion 316 of the chassis 314. Attaching the plurality of circuit boards 320, 322, 324 includes attaching the RF circuit board 320 to a first side of the planar portion 316 and attaching the digital circuit board 322 to a second side of the planar portion 316, wherein the second side of the planar portion is reverse of the first side. Attaching the plurality of circuit boards 320, 322, 324 also includes attaching the power supply board 324 to the sidewalls 318 of the chassis 314, proximate the digital circuit board 322.

A first, second, and third isolation covers 326, 328, 330 can also be attached to the chassis 314. The first isolation cover 326 can be attached along with the RF circuit board 320 to the first side of the planar portion 316. The second isolation cover 328 can be attached along with the digital circuit board 324 to the second side of the planar portion 316. The third isolation cover 330 can be attached along with the power supply board 324 to the sidewalls 318 of the chassis 314.

The chassis 314 can be attached to the inner portion 308 of the base 302, such that the planar portion 316 and the plurality of circuit boards 320, 322, 324 are oriented perpendicular to the base 302 and extend in parallel with the long dimension 306 of the inner portion 308.

The lighting protection circuit board 334 can be disposed on the top edge of the chassis 314. The environmental housing 332 is placed around the chassis 314 having the plurality of circuit boards, 320, 322, 324 and the isolation covers 326, 328, 330 attached thereto and the lightning protection circuit board 334 thereon. As the environmental housing 332 is placed around the chassis 314, the connector 336 is inserted through the aperture 338 in the environmental housing 332. The chassis 314 can then be attached to the base 302. The gasket 340 can be placed on the flange 312 of the base 302.

Once the radar altimeter 100 is assembled. The radar altimeter 100 can be inserted into an aperture 202 in an aircraft's exterior 102 by inserting the environmental housing 332 along with the chassis 314, the plurality of circuit boards, 320, 322, 324, the isolation covers 326, 328, 330, and the lightning protection circuit board 334 therein into the aperture 202. The radar altimeter 100 is inserted until the flange 312 contacts the exterior surface of the aircraft's exterior 102. The flange 312 can then be fastened to the aircraft's exterior 102 by, for example, a plurality of bolts.

In this way, the vast majority of the radar altimeter 100 can be contained internal to the aircraft's exterior 102, while still being able to be removed and installed form the exterior of the aircraft. Additionally, the aspect ratio of the radar altimeter 100 enables the radar altimeter 100 to be installed in between structural members 104 in the aircraft. Finally, the radar altimeter 100 provides access for the antenna mounted in the base 102 to send and receive signals outside of the aircraft. The base 302, while being mounted to the external surface of the aircraft, extends less than 5 mm outward from the external surface of the aircraft's skin 106. This produces little aerodynamic effect on the aircraft.

In an example, the radar altimeter 100 is a frequency modulated continuous wave (FMCW) radar that can transmit and receive from a single antenna with high sensitivity.

Example Embodiments

Example 1 includes a radar altimeter for mounting onto an aircraft, the radar altimeter comprising: a base configured to mount to an external surface of an aircraft, the base having an inner portion defining a first aperture and a flange disposed around the inner portion, wherein the inner portion has a generally rectangular geometry defining a long dimension and a short dimension; a chassis mounted to the base and having a planar portion that is disposed perpendicular to a plane formed by the base and extends parallel to the long dimension of the generally rectangular geometry; a plurality of circuit boards mounted to the planar portion of the chassis and disposed parallel to the planar portion of the chassis; and an antenna module disposed proximate a first aperture formed in the base, the antenna module coupled to at least one of the plurality of circuit boards; wherein the base is configured to mount over a second aperture in the external surface of the aircraft such that the chassis and the plurality of circuit boards are placed through the aperture and are disposed inside of the aircraft.

Example 2 includes the radar altimeter of Example 1, wherein the inner portion is configured to fit inside the second aperture in the external surface of the aircraft, the inner portion defining the first aperture for the antenna module and configured to have the chassis mounted thereto, and wherein the base includes a flange forming a perimeter around the inner portion, the flange configured to be attached to the external surface of the aircraft.

Example 3 includes the radar altimeter of any of Examples 1 or 2, wherein the plurality of circuit boards include: an RF circuit board mounted to a first side of the planar portion of the chassis, the RF circuit board including a transceiver front end; and a digital circuit board mounted to a second side of the planar portion of the chassis, the second side reverse of the first side, the digital circuit board including at least one processing device; wherein the chassis is composed of a metal and configured to isolate radio frequency signals between the first and second sides.

Example 4 includes the radar altimeter of Example 3, wherein the plurality of circuit boards include a power supply board configured to condition power for the digital circuit board and the RF circuit board; and wherein the radar altimeter includes an isolation board disposed between the power supply board and the digital circuit board, the isolation board configured to isolate radio frequency signals between the digital circuit board and the power supply board.

Example 5 includes the radar altimeter of Example 4, comprising: a first isolation cover disposed to cover a side of the RF circuit board that is reverse of the chassis; and a second isolation cover disposed to cover a side of the power supply board that is reverse of the isolation board.

Example 6 includes the radar altimeter of any of Examples 1-5, comprising: a lightning protection circuit board oriented parallel to the base and disposed outward from a first edge of the planar portion of the chassis, the first edge opposite the base.

Example 7 includes the radar altimeter of Example 6, wherein the lightning protection circuit board includes a connector for connecting to a communication cable.

Example 8 includes the radar altimeter of Example 7, comprising: an environmental housing disposed over and around the chassis, the plurality of circuit boards, and the lightning protection circuit board, the environmental housing defining a third aperture wherein the connector extends through the third aperture.

Example 9 includes the radar altimeter of any of Examples 1-8, wherein the antenna module is configured to transmit and receive signals through the first aperture.

Example 10 includes a method of constructing a radar altimeter, the method comprising: providing a chassis composed primarily of a planar portion; attaching a plurality of circuit boards to the planar portion of the chassis, wherein the plurality of circuit boards are oriented in parallel with the planar portion of the chassis; providing a base configured to mount to an external surface of an aircraft, the base having inner portion that has a generally rectangular geometry defining a short dimension and a long dimension, wherein the short dimension of the generally rectangular geometry is less than 3 inches in length; attaching an antenna module to the base; attaching the chassis to the base such that the planar portion is perpendicular to the base; providing an environmental housing configured to surround the chassis and the plurality of circuit boards; inserting the chassis with the plurality of circuit boards attached thereto into the environmental housing; and attaching the environmental housing to the chassis.

Example 11 includes the method of Example 10, wherein the inner portion defines a first aperture, the inner portion configured to fit inside a second aperture in an external surface of the aircraft, wherein the base includes a flange forming a perimeter around the inner portion, the flange configured to be attached to the external surface of the aircraft; and wherein attaching an antenna module to the base includes positioning a portion of the antenna module inside the first aperture; and wherein attaching a chassis to the base includes attaching the chassis to the inner portion of the base.

Example 12 includes the method of any of Examples 10 or 11, comprising: attaching a lightning protection circuit board to an internal surface of the environmental housing, wherein attaching the lightning protection circuit board includes inserting a connector on the lightning protection circuit board through a third aperture defined in the environmental housing.

Example 13 includes the method of any of Examples 10-12, wherein attaching a plurality of circuit boards to the planar portion of the chassis includes: attaching an RF circuit board to a first side of the planar portion, the RF circuit board including a transceiver front end; and attaching a digital circuit board to a second side of the planar portion, the second side reverse of the first side, the digital circuit board including at least one processing device.

Example 14 includes the method of Example 13, wherein attaching the digital circuit board to the chassis includes attaching a first isolation cover along with the digital circuit board to the chassis, wherein the first isolation cover is disposed to cover a side of the digital circuit board that is reverse of the planar portion of the chassis; attaching a power supply board to the chassis proximate a side of the isolation board that is reverse of the digital circuit board, wherein the power supply board is disposed parallel to the planar portion of the chassis; and wherein inserting the chassis with the plurality of circuit boards attached thereto into the environmental housing includes inserting the first isolation board and the power supply board attached to chassis into the environmental housing.

Example 15 includes the method of Example 14, wherein: wherein attaching an RF circuit board to the chassis includes attaching a second isolation cover along with the RF circuit board to the chassis, wherein the second isolation cover is disposed to cover a side of the RF circuit board that is reverse of the chassis; and wherein attaching a power supply board to the chassis includes attaching a third isolation cover along with the power supply board to the chassis wherein the third isolation cover is disposed to cover a side of the power supply board that is reverse of the isolation board; wherein inserting the chassis with the plurality of circuit boards attached thereto into the environmental housing includes inserting the second isolation cover and the third isolation cover attached to the RF circuit board and the power supply board respectively, into the environmental housing.

Example 16 includes a radar altimeter for mounting onto an aircraft, the radar altimeter comprising: a base including an inner portion defining a first aperture and a flange forming a perimeter around the inner portion, the inner portion having a generally rectangular geometry defining a short dimension and a long dimension, wherein the short dimension is less than 3 inches in length, wherein the inner portion is configured to fit inside a second aperture in an external surface of the aircraft and the flange configured to attach to the external surface of the aircraft surrounding the second aperture; an antenna module disposed in the first aperture of the inner portion of the base; a chassis mounted to the inner portion of the base, the chassis having a planar portion that is disposed perpendicular to the base, the chassis composed of metal; an RF circuit board mounted to a first side of the planar portion of the chassis such that the RF circuit board is parallel to the planar portion of the chassis, the RF circuit board including a transceiver front end; a digital circuit board mounted to a second side of the planar portion of the chassis such that the digital circuit board is parallel to the planar portion of the chassis, the second side reverse of the first side, the digital circuit board including at least one processing device; and wherein the chassis and the plurality of circuit boards are configured to be inserted through the second aperture and disposed inside the aircraft when the base is mounted to the external surface of the aircraft.

Example 17 includes the radar altimeter of Example 16, comprising: a power supply board mounted to the chassis such that the power supply board is parallel to the planar portion of the chassis and outward from the second side of the planar portion.

Example 18 includes the radar altimeter of Example 17, comprising: a first isolation cover disposed between the digital circuit board and the power supply board and disposed to cover a side of the digital circuit board that is reverse of the planar portion; a second isolation cover disposed to cover a side of the RF circuit board that is reverse of the planar portion; and a third isolation cover disposed to cover a side of the power supply board that is reverse of the first isolation cover.

Example 19 includes the radar altimeter of any of Examples 16-18, comprising: an environmental housing disposed over and around the chassis, the RF circuit board, and the digital circuit board.

Example 20 includes the radar altimeter of Example 19, comprising: a lightning protection circuit board oriented parallel to the base and disposed outward from an edge of the planar portion of the chassis that is opposite the base.

What is claimed is:

1. A radar altimeter for mounting onto an aircraft, the radar altimeter comprising:
   a base configured to mount to an external surface of an aircraft, the base having an inner portion defining a first aperture and a flange disposed around the inner portion, wherein the inner portion has a generally rectangular geometry defining a long dimension and a short dimension;
   a chassis mounted to the base and having a planar portion that is disposed perpendicular to a plane formed by the base and extends parallel to the long dimension of the generally rectangular geometry;
   a plurality of circuit boards mounted to the planar portion of the chassis and disposed parallel to the planar portion of the chassis; and
   an antenna module disposed proximate a first aperture formed in the base, the antenna module coupled to at least one of the plurality of circuit boards;
   wherein the base is configured to mount over a second aperture in the external surface of the aircraft such that the chassis and the plurality of circuit boards are placed through the aperture and are disposed inside of the aircraft.

2. The radar altimeter of claim 1, wherein the inner portion is configured to fit inside the second aperture in the external surface of the aircraft, the inner portion defining the first aperture for the antenna module and configured to have the chassis mounted thereto, and wherein the base includes a flange forming a perimeter around the inner portion, the flange configured to be attached to the external surface of the aircraft.

3. The radar altimeter of claim 1, wherein the plurality of circuit boards include:
   an RF circuit board mounted to a first side of the planar portion of the chassis, the RF circuit board including a transceiver front end; and
   a digital circuit board mounted to a second side of the planar portion of the chassis, the second side reverse of the first side, the digital circuit board including at least one processing device;
   wherein the chassis is composed of a metal and configured to isolate radio frequency signals between the first and second sides.

4. The radar altimeter of claim 3, wherein the plurality of circuit boards include a power supply board configured to condition power for the digital circuit board and the RF circuit board; and
   wherein the radar altimeter includes an isolation board disposed between the power supply board and the digital circuit board, the isolation board configured to isolate radio frequency signals between the digital circuit board and the power supply board.

5. The radar altimeter of claim 4, comprising:
   a first isolation cover disposed to cover a side of the RF circuit board that is reverse of the chassis; and
   a second isolation cover disposed to cover a side of the power supply board that is reverse of the isolation board.

6. The radar altimeter of claim 1, comprising:
   a lightning protection circuit board oriented parallel to the base and disposed outward from a first edge of the planar portion of the chassis, the first edge opposite the base.

7. The radar altimeter of claim 6, wherein the lightning protection circuit board includes a connector for connecting to a communication cable.

8. The radar altimeter of claim 7, comprising:
   an environmental housing disposed over and around the chassis, the plurality of circuit boards, and the lightning protection circuit board, the environmental housing defining a third aperture wherein the connector extends through the third aperture.

9. The radar altimeter of claim 1, wherein the antenna module is configured to transmit and receive signals through the first aperture.

10. A method of constructing a radar altimeter, the method comprising:
    providing a chassis composed primarily of a planar portion;
    attaching a plurality of circuit boards to the planar portion of the chassis, wherein the plurality of circuit boards are oriented in parallel with the planar portion of the chassis;
    providing a base configured to mount to an external surface of an aircraft, the base having inner portion that has a generally rectangular geometry defining a short dimension and a long dimension, wherein the short dimension of the generally rectangular geometry is less than 3 inches in length;
    attaching an antenna module to the base;
    attaching the chassis to the base such that the planar portion is perpendicular to the base;
    providing an environmental housing configured to surround the chassis and the plurality of circuit boards;
    inserting the chassis with the plurality of circuit boards attached thereto into the environmental housing; and
    attaching the environmental housing to the chassis.

11. The method of claim 10, wherein the inner portion defines a first aperture, the inner portion configured to fit inside a second aperture in an external surface of the aircraft, wherein the base includes a flange forming a perimeter around the inner portion, the flange configured to be attached to the external surface of the aircraft; and
    wherein attaching an antenna module to the base includes positioning a portion of the antenna module inside the first aperture; and wherein attaching a chassis to the base includes attaching the chassis to the inner portion of the base.

12. The method of claim 10, comprising:
attaching a lightning protection circuit board to an internal surface of the environmental housing, wherein attaching the lightning protection circuit board includes inserting a connector on the lightning protection circuit board through a third aperture defined in the environmental housing.

13. The method of claim 10, wherein attaching a plurality of circuit boards to the planar portion of the chassis includes:
attaching an RF circuit board to a first side of the planar portion, the RF circuit board including a transceiver front end; and
attaching a digital circuit board to a second side of the planar portion, the second side reverse of the first side, the digital circuit board including at least one processing device.

14. The method of claim 13, wherein attaching the digital circuit board to the chassis includes attaching a first isolation cover along with the digital circuit board to the chassis, wherein the first isolation cover is disposed to cover a side of the digital circuit board that is reverse of the planar portion of the chassis;
attaching a power supply board to the chassis proximate a side of the first isolation cover that is reverse of the digital circuit board, wherein the power supply board is disposed parallel to the planar portion of the chassis; and
wherein inserting the chassis with the plurality of circuit boards attached thereto into the environmental housing includes inserting the first isolation cover and the power supply board attached to chassis into the environmental housing.

15. The method of claim 14, wherein:
wherein attaching an RF circuit board to the chassis includes attaching a second isolation cover along with the RF circuit board to the chassis, wherein the second isolation cover is disposed to cover a side of the RF circuit board that is reverse of the chassis; and
wherein attaching a power supply board to the chassis includes attaching a third isolation cover along with the power supply board to the chassis wherein the third isolation cover is disposed to cover a side of the power supply board that is reverse of first the isolation cover;
wherein inserting the chassis with the plurality of circuit boards attached thereto into the environmental housing includes inserting the second isolation cover and the third isolation cover attached to the RF circuit board and the power supply board respectively, into the environmental housing.

16. A radar altimeter for mounting onto an aircraft, the radar altimeter comprising:

a base including an inner portion defining a first aperture and a flange forming a perimeter around the inner portion, the inner portion having a generally rectangular geometry defining a short dimension and a long dimension, wherein the short dimension is less than 3 inches in length, wherein the inner portion is configured to fit inside a second aperture in an external surface of the aircraft and the flange is configured to attach to the external surface of the aircraft surrounding the second aperture;
an antenna module disposed in the first aperture of the inner portion of the base;
a chassis mounted to the inner portion of the base, the chassis having a planar portion that is disposed perpendicular to the base, the chassis composed of metal;
an RF circuit board mounted to a first side of the planar portion of the chassis such that the RF circuit board is parallel to the planar portion of the chassis, the RF circuit board including a transceiver front end;
a digital circuit board mounted to a second side of the planar portion of the chassis such that the digital circuit board is parallel to the planar portion of the chassis, the second side reverse of the first side, the digital circuit board including at least one processing device; and
wherein the chassis and the plurality of circuit boards are configured to be inserted through the second aperture and disposed inside the aircraft when the base is mounted to the external surface of the aircraft.

17. The radar altimeter of claim 16, comprising:
a power supply board mounted to the chassis such that the power supply board is parallel to the planar portion of the chassis and outward from the second side of the planar portion.

18. The radar altimeter of claim 17, comprising:
a first isolation cover disposed between the digital circuit board and the power supply board and disposed to cover a side of the digital circuit board that is reverse of the planar portion;
a second isolation cover disposed to cover a side of the RF circuit board that is reverse of the planar portion; and
a third isolation cover disposed to cover a side of the power supply board that is reverse of the first isolation cover.

19. The radar altimeter of claim 16, comprising:
an environmental housing disposed over and around the chassis, the RF circuit board, and the digital circuit board.

20. The radar altimeter of claim 19, comprising:
a lightning protection circuit board oriented parallel to the base and disposed outward from an edge of the planar portion of the chassis that is opposite the base.

* * * * *